United States Patent
Simitsis et al.

(10) Patent No.: US 9,600,786 B2
(45) Date of Patent: Mar. 21, 2017

(54) OPTIMIZING ANALYTIC FLOWS

(71) Applicant: HEWLETT-PACKARD DEVELOPMENT COMPANY, L.P., Houston, TX (US)

(72) Inventors: Alkiviadis Simitsis, Santa Clara, CA (US); William K. Wilkinson, San Mateo, CA (US); Petar Jovanovic, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1003 days.

(21) Appl. No.: 13/859,564

(22) Filed: Apr. 9, 2013

(65) Prior Publication Data

US 2014/0303933 A1 Oct. 9, 2014

(51) Int. Cl.
- *G06F 19/00* (2011.01)
- *G06Q 10/06* (2012.01)
- *G06Q 30/02* (2012.01)

(52) U.S. Cl.
CPC ....... *G06Q 10/063* (2013.01); *G06Q 30/0201* (2013.01)

(58) Field of Classification Search
CPC ............... G06F 11/3495; G06F 9/5072; B60K 2350/1068

USPC .......................................... 702/181, 182–185
See application file for complete search history.

(56) References Cited

U.S. PATENT DOCUMENTS

| | | | |
|---|---|---|---|
| 6,738,782 B2 | 5/2004 | Agarwal et al. | |
| 7,917,502 B2 | 3/2011 | Cheng et al. | |
| 8,374,102 B2 | 2/2013 | Luft et al. | |
| 2003/0204789 A1* | 10/2003 | Peebles | G06F 11/0715 714/47.2 |
| 2009/0049012 A1 | 2/2009 | Bossman et al. | |

OTHER PUBLICATIONS

Albrecht, M. et al.; "Makeflow: a Portable Abstraction for Data Intensive Computing on Clusters, Clouds, and Grids"; May 2012; http://www3.nd.edu/~ccl/research/papers/makeflow-sweet12-camera.pdf.

* cited by examiner

*Primary Examiner* — Edward Raymond
(74) *Attorney, Agent, or Firm* — Fabian VanCott (57) ABSTRACT

A technique of optimizing analytic flows includes sampling source data using a sampling method, executing a flow over the sampled data, obtaining runtime statistics from the executed flow, and combining runtime statistics with historical statistics.

15 Claims, 8 Drawing Sheets

OPTIMIZING ANALYTIC FLOWS

BACKGROUND

Business intelligence deals with the consolidation and analysis of data collected in a day-to-day operation of a business. This analysis may be used as a basis for making more informed business decisions and create a competitive advantage for an entity that utilizes such analysis. Business intelligence involves data flows that may span different execution engines, contain complex functionality like data/text analytics and machine learning operations, and are often optimized against various objectives. Creating correct analytic data flows in such an environment is a challenging task and is both labor-intensive and time-consuming. Optimizing these flows may be an ad-hoc process where the result is largely dependent on the abilities and experience of the flow designer.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

The present disclosure describes systems and methods for the collection of flow statistics at runtime. These flow statistics may be combined with historical execution information for similar flows or operations in order to produce up-to-date cost estimates and cost models for flow execution.

Analytic flow optimization may be a difficult process that depends on accurate and correct cost models. However, a cost model may be relatively inaccurate if it is fed with erroneous or out-of-date statistics. The present disclosure describes automatic collection of flow execution statistics at runtime, and the combination of those flow execution statistics with historical statistics. The historical statistics may be obtained from micro-benchmarks or previous flow executions. Further, the present analytic flow optimization techniques may be incorporated into existing flow design and execution tools without considerable effort.

The statistics obtained from the present systems and methods may be used to calibrate an optimizer module associated with business intelligence analysis, and may be used to enable the generation of more accurate execution plans. Example optimization techniques enabled by the present systems and methods may include generation of alternate flows with different structure and/or different implementation.

The present disclosure, therefore, describes systems and methods for optimizing analytic flows. An example method may comprise sampling source data using a sampling method, executing a flow over the sampled data, obtaining runtime statistics from the executed flow, and combining runtime statistics with historical statistics. An example system for optimizing analytic flows may comprise a processor, a memory communicatively coupled to the processor, and a statistical analysis module stored in the memory. The statistical analysis module may obtain a flow, F, identify a number of statistical variants, $S_V$, identify a number of source data stores, analyze the source data stores to identify a sampling method, S, for sampling the source data, sample the source data using the sampling method, S to obtain sampled data, execute the flow, F, using the sampled data, obtain runtime statistics, $S_f$, for the statistical variants, $S_V$, and combine the runtime statistics with historical statistics.

An example computer program product for optimizing analytic flow may comprise a computer readable storage medium comprising computer usable program code embodied therewith. The computer usable program code may comprise computer usable program code to, when executed by a processor, design an analytic flow. The computer usable program code may further comprise computer usable program code to, when executed by a processor, combine runtime statistics of an executed instance of the flow over the sampled data. The computer usable program code may further comprise computer usable program code to, when executed by a processor, combine the runtime statistics with historical statistics, optimize the flow based on the combination of the runtime statistics and historical statistics, and re-execute the flow based on the optimized flow over the source dataset.

As used in the present specification and in the appended claims, the term "optimize" or similar language is meant to be understood broadly as any method, system, or combination thereof for achieving improved performance within an analytic flow system. In one example, a decrease in costs within the analytic flow system is an optimization.

As used in the present specification and in the appended claims, the term "cost" is meant to be understood broadly as an estimated total resource usage that is necessary to execute any portion of a flow design, optimization, and execution operation. Cost may be derived from a combination of processor cost in number of instructions, memory utilization, latency, network bandwidth, throughput, monetary cost, and I/O cost in numbers of seeks and page transfers, among other forms of cost.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods.

It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Using statistics for calibrating database optimizers allows for a business entity to make more accurate and informed business decisions. The present disclosure demonstrates how this can be performed in complex analytic flows that may have multiple objectives and may span multiple engines, not just a database engine. The present systems and methods collect runtime statistics and combine them with historical statistics to increase the accuracy of a cost prediction. The present disclosure demonstrates how this can be realized automatically without manual effort. The present techniques are generic and may be easily applied to most flow design and execution tools without having to change their codebase.

Figure 1:
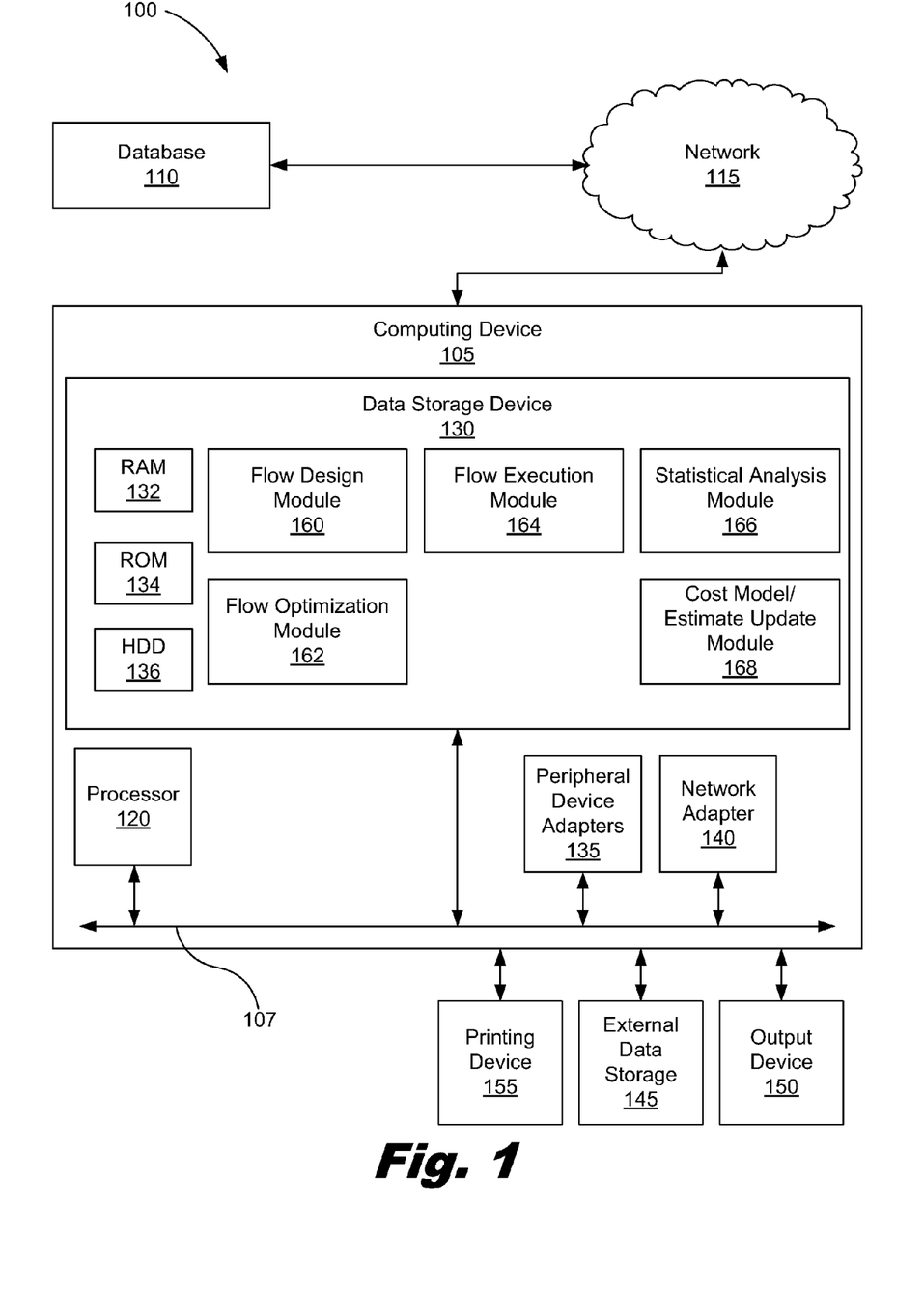
FIG. 1 is a diagram of a system for the collection of flow statistics, according to one example of the principles described herein.

FIG. 1 is a diagram of a system for the collection of flow statistics (100), according to one example of the principles described herein. In one example, the flow statistics collection system (100) is a computing device that performs the methods described herein within a networking environment. In this example, the networking environment may be a network of a number of computers, an internet, an intranet, or the Internet. The networking environment may also comprise a cloud network environment including, for example, a private cloud network, a public cloud network, or a hybrid cloud network, among others. In another example, the networking environment may be a mobile network environment. In still another example, the networking environment may be a virtualized network environment.

In one example, the flow statistics collection system (100) may be embodied within and executable on, for example, a mobile computing device such as, for example, a mobile phone, smart phone, personal digital assistant (PDA), a tablet, or a laptop computer with the capability of performing the methods described herein. In another example, the flow statistics collection system (100) may be embodied within an executable on a desktop computing environment, among other computing devices.

The flow statistics collection system (100) may comprise a computing device (105) that has access to a database (110). In the present example, for the purposes of simplicity in illustration, the computing device (105) and the database (110) are separate computing devices communicatively coupled to each other through a network (115). However, the principles set forth in the present specification extend equally to any alternative configuration in which a computing device (105) has complete access to a database (110). As such, alternative examples within the scope of the principles of the present specification include, but are not limited to, examples in which the computing device (105) and the database (110) are implemented by the same computing device, examples in which the functionality of the computing device (105) is implemented by multiple interconnected computers, for example, a server in a data center and a user's client machine, examples in which the computing device (105) and the database (110) communicate directly through a bus without intermediary network devices, and examples in which the computing device (105) has a stored local copy of the database (110) that is to be utilized.

The computing device (105) of the present example collects runtime statistics and combines them with historical statistics to increase the accuracy of a cost prediction. In the present example, this may be accomplished by the computing device (105) requesting the data or records contained within the database (110) over the network (115) using the appropriate network protocol, for example, Internet Protocol ("IP"). In another example, the computing device (105) may request data or records contained within other data storage devices such as, for example, data storage device (130) and external data storage (145). Example processes are set forth in more detail below.

To achieve its desired functionality, the computing device (105) includes various hardware components. Among these hardware components may be a processor (120), a data storage device (130), peripheral device adapters (135), and a network adapter (140). These hardware components may be interconnected through the use of one or more busses and/or network connections. In one example, the processor (120), data storage device (130), peripheral device adapters (135), and network adapter (140) may be communicatively coupled via bus (107).

Even though one processor (120) is depicted in FIG. 1, any number of processors may be present within the computing device (105) or distributed among a number of computing devices. The processor (120) may include the hardware architecture for retrieving executable code from the data storage device (130) and executing the executable code. The executable code may, when executed by the processor (120), cause the processor (120) to implement at least the functionality of collecting runtime statistics and combining them with historical statistics to increase the accuracy of a cost prediction in order to increase the accuracy of a cost prediction automatically without manual effort without having to change the codebase of flow design and execution tools according to the methods of the present specification described below. In the course of executing code, the processor (120) may receive input from and provide output to one or more of the remaining hardware units within the system (100).

In one example, the computing device (105), and, specifically, the processor (120) accesses data within the database (110), data storage device (110), and external data storage (145) in order to collect runtime statistics, combine the runtime statistics with historical statistics to increase the accuracy of a cost prediction, and present data associated with flow design, flow optimization, and flow execution to a user via an output device (150) communicatively coupled to the computing device (105), among other processes. The processor (120), in one example, presents to the user with a user interface on the output device (150). The output device (150) may be any number of devices that provide a representation of, for example, the flow design flow optimization, flow execution, or user interfaces to a user. In one example, the output device (150) is a display device such as a cathode ray tube, a plasma display, or a liquid crystal display, among others.

The data storage device (130) may store data that is processed and produced by the processor (120). The data storage device (130) may include various types of memory modules, including volatile and nonvolatile memory. For example, the data storage device (130) of the present example includes random access memory (RAM) (132), read only memory (ROM) (134), and a hard disk drive (HDD) (136) memory. Many other types of memory may be employed, and the present specification contemplates the use of many varying type(s) of memory in the data storage device (130) as may suit a particular application of the principles described herein. In certain examples, different types of memory in the data storage device (130) may be used for different data storage needs. For example, in certain examples the processor (120) may boot from ROM (134), maintain nonvolatile storage in the HDD (136) memory, and execute program code stored in RAM (132).

In one example, the data storage device (130) stores computer usable program code to, when executed by the processor (120), perform a number of processes within the system's (100) environment. For example, the data storage device (130) may comprise a flow design module (160), a flow optimization module (162), a flow execution module (164), a statistical analysis module (166), and a cost model/estimate update module (168), among other modules. These various modules and their functions when executed will be described in more detail below. However, when executing the various modules, the processor (120) collects runtime statistics, combines the runtime statistics with historical statistics to increase the accuracy of a cost prediction, and presents data associated with flow design, flow optimization, and flow execution to a user via an output device (150) communicatively coupled to the computing device (105), among other processes.

Generally, the data storage device (130) may comprise a computer readable storage medium. For example, the data storage device (130) may be, but not limited to, an electronic, magnetic, optical, electromagnetic, infrared, or semiconductor system, apparatus, or device, or any suitable combination thereof. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device such as, for example, the processor (120). In another example, a computer readable storage medium may be any form of non-transitory medium.

The peripheral device adapters (135) and network adapter (140) in the computing device (105) enable the processor (120) to interface with various other hardware elements, external and internal to the computing device (105). For example, peripheral device adapters (135) may provide an interface to input/output devices, such as, for example, output device (150), to create a user interface and/or access external sources of memory storage, such as, for example, the database (110) and external data storage (145). As addressed above and discussed below, an output device (150) may be provided to allow a user to interact with computing device (105) in order retrieve data from a data source.

Peripheral device adapters (135) may also create an interface between the processor (120) and other media output devices. For example, where the computing device (105) analyzes data flows, the computing device (105) may instruct a printing device (155) to create one or more physical copies of the sorted data or records. A network adapter (140) may additionally provide an interface to the network (115), thereby enabling the transmission of data or records to and receipt of the data or records from other devices on the network (115), including the database (110). In one example, the network (115) may comprise two or more computing devices communicatively coupled. For example, the network (115) may include a local area network (LAN), a wide area network (WAN), a virtual private network (VPN), and the Internet, among others.

The present flow statistics collection system (100) and the associated methods employed by the flow statistics collection system (100) may be utilized to address analytic flow optimization for a number of objectives over a number of execution engines.

Analytic flows may be designed using design tools or can be created from code scripts such as, for example, structured query language (SQL) or Pig scripts. Pig is a high-level platform for creating MapReduce programs and was developed at Yahoo Research and distributed by Apache Software Foundation. Irrelevant of how a flow has been created, the flow can be shown in a flow design and execution tool such as an extract, transform, and load (ETL) tool. ETL is any process in database usage or data warehousing that involves extracting data from source data stores, transforming the data to fit operational needs including quality levels, and loading the data into target data stores or directly populating a result display such as a report or a dashboard. The present systems and methods utilize an ETL tool to collect statistics, such as, for example, statistics about the execution of a flow, and of the flow's individual operators, among other information.

Figure 2:
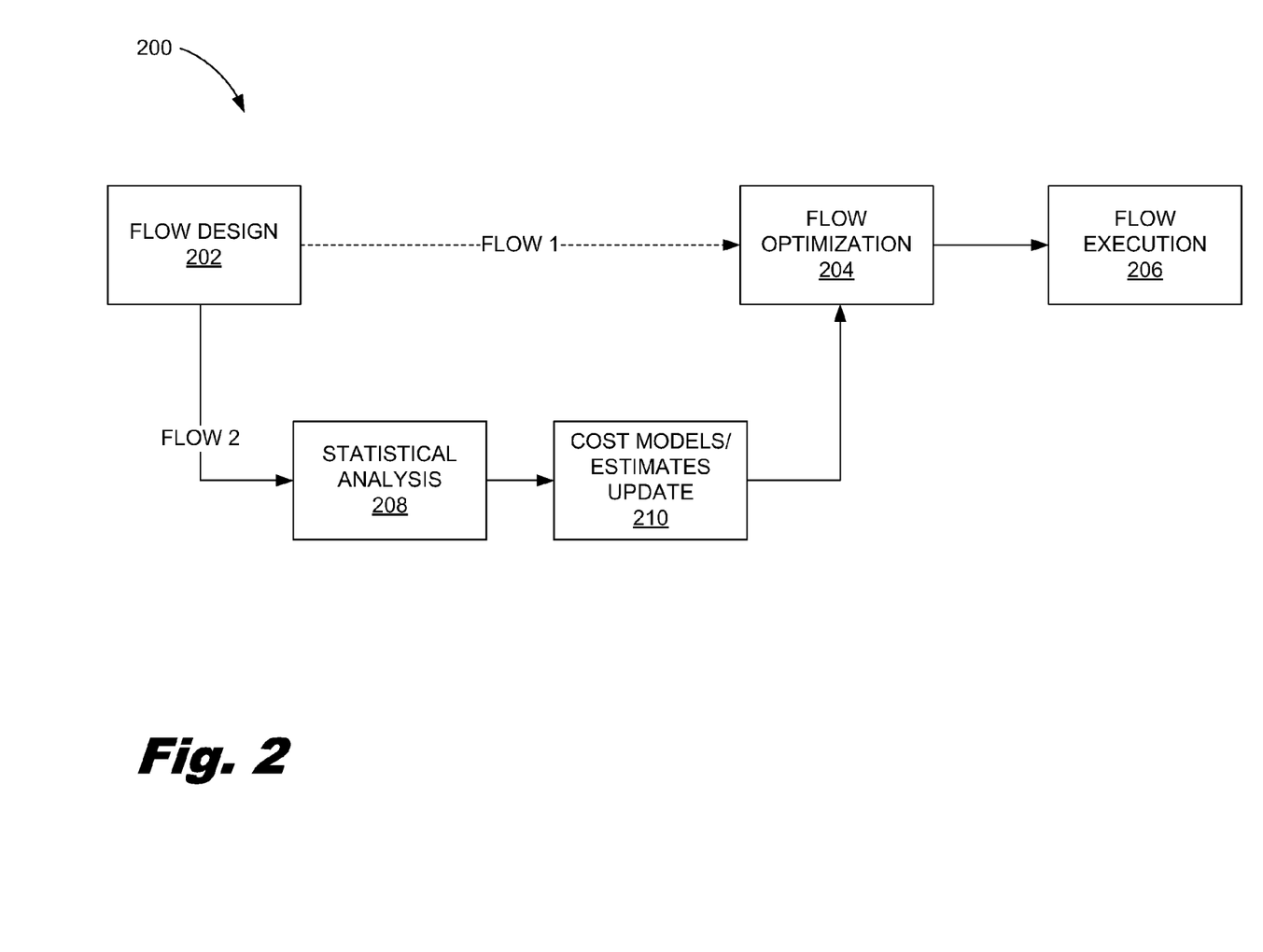
FIG. 2 is a diagram of an analytic flow, according to one example of the principles described herein.

A high level description of the present systems and methods is illustrated in FIG. 2. FIG. 2 is a diagram showing the lifecycle of an analytic flow (200), according to one example of the principles described herein. The upper path designated as "flow 1" in FIG. 2 depicts a flow lifecycle from design (block 202) to optimization (block 204), and execution (block 206) utilizing the flow design module (FIG. 1, 160), flow optimization module (FIG. 1, 162), and flow execution module (FIG. 1, 164), respectively. The flow design module (FIG. 1, 160) is utilized to design the analytic flows that are executed in the system (FIG. 1, 100). The flow optimization module (FIG. 1, 162) is used to optimized the analytic flow so that the analytic flow is effective in achieving a number of objectives for a user such as a business entity with as minimum of a cost as possible. The flow execution module (FIG. 1, 164) executes the analytic flow within the system (FIG. 1, 100). The present systems and methods enable better cost estimates or models for the optimization through the lower path designated as "flow 2" of FIG. 2. This path involves a statistical analysis module (block 208) and a cost model/estimate update module (block 210).

Figure 3:
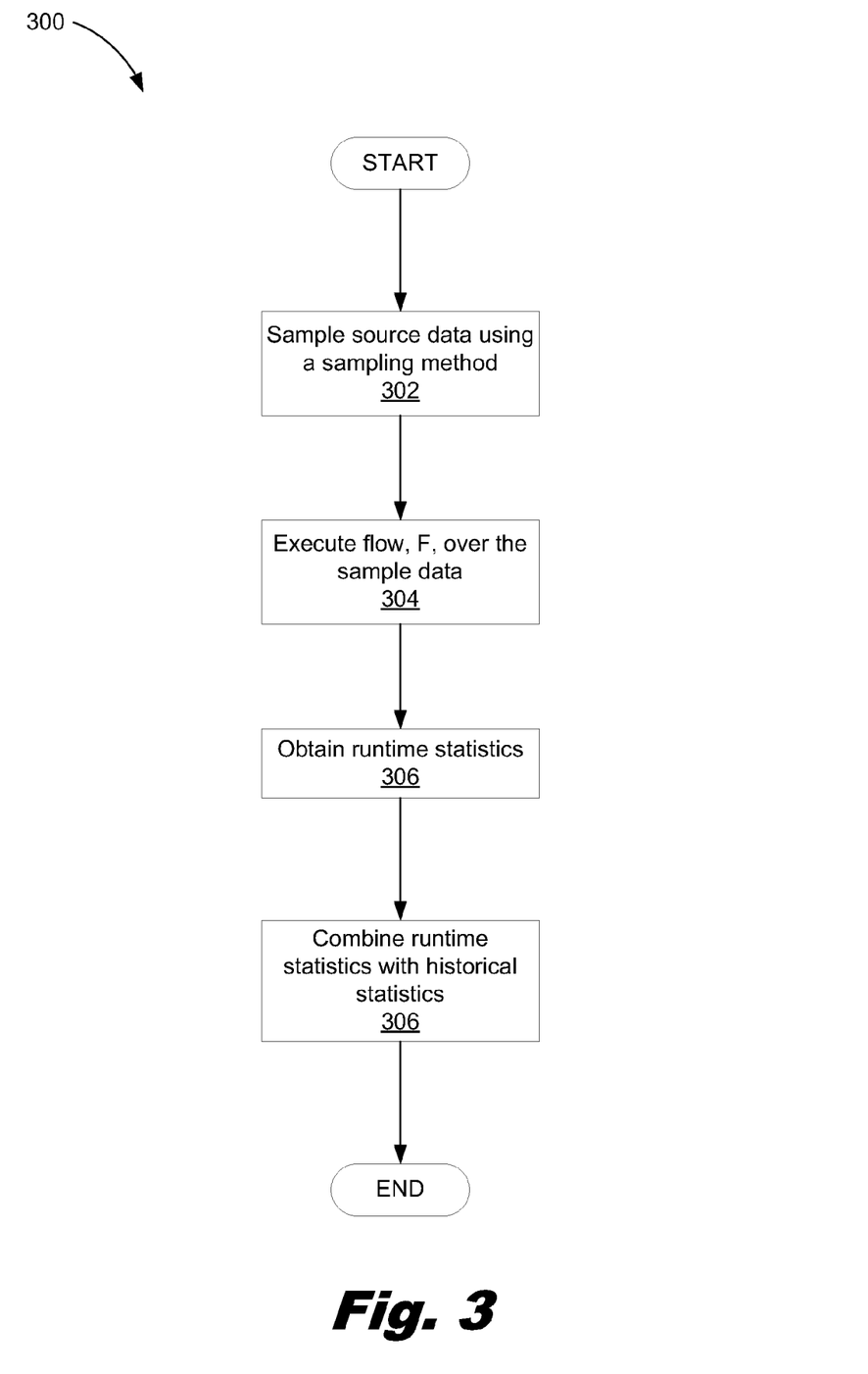
FIG. 3 is a flowchart showing a method for statistical analysis, according to one example of the principles described herein.

The functionality of the statistical analysis module (block 208) of FIG. 2 is demonstrated in FIG. 3. FIG. 3 is a flowchart showing a method (300) for statistical analysis, according to one example of the principles described herein. The method of FIG. 3 may begin by the processor (FIG. 1, 120) executing the statistical analysis module (FIG. 1, 166) to sample (block 302) source data using a sampling method. In one example, the source data may be stored within the database (110) of FIG. 1, or another database internal or external to the computing device (FIG. 1, 105) such as, for example, the data storage device (130), the external data storage (145), volatile or non volatile memory, or another data storage device.

Execution (block 304) of flow, F, over the sample data may take place by the processor (FIG. 1, 120) utilizing another aspect of the statistical analysis module (FIG. 1, 166). A number of runtime statistics may be obtained (block 306) from the execution of flow F, and combined (block 308) with a number of historical statistics. As will be described in more detail below, the newly obtained runtime statistics combined with historical statistics may then be used by the processor (120) executing the cost model/estimate update module (168) to tune the cost models according to both the runtime statistics and historical statistics, and to provide updated cost estimates for the execution of the flow. These statistics may be used to optimize the flow design to make analytic data flows more cost effective for a consumer of business intelligence services. The method of FIG. 3 will now be described in more detail in connection with FIG. 4.

Figure 4:
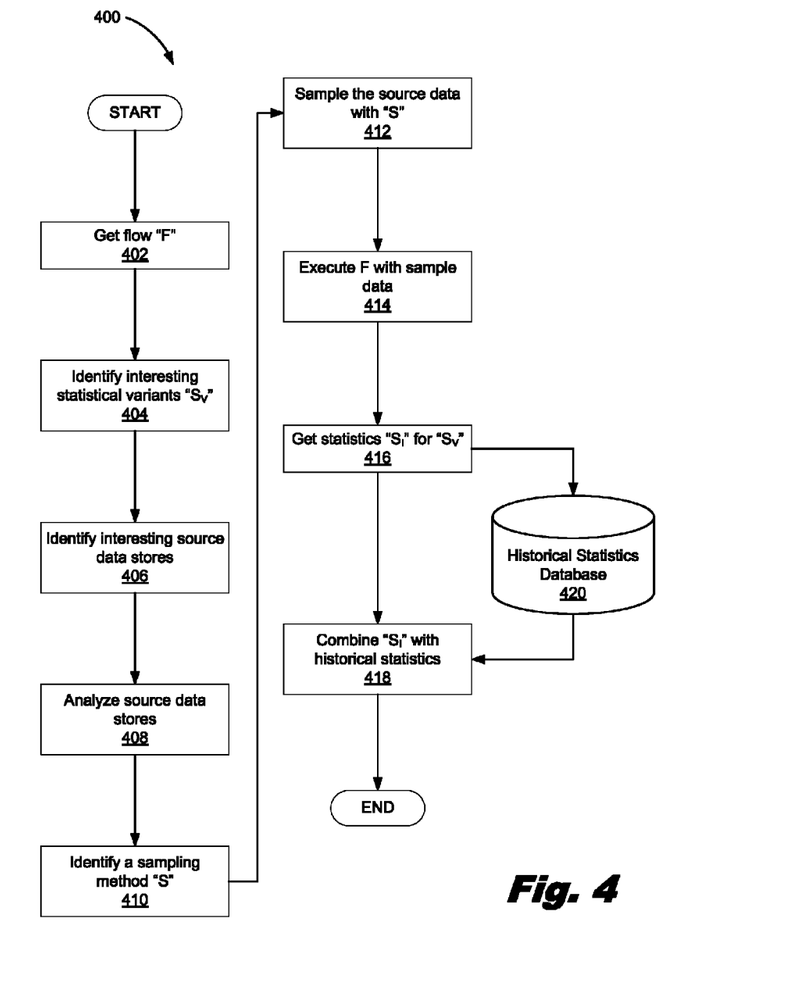
FIG. 4 is a flowchart showing a method for statistical analysis, according to another example of the principles described herein.

FIG. 4 is a flowchart showing a method for statistical analysis, according to another example of the principles described herein. The statistical analysis module (FIG. 1, 166) of the computing device (105) comprises a number of the functionalities performed within the method of FIG. 4. The method of FIG. 4 may begin with obtaining (block 402) a flow, F, and applying a flow analysis. F is analyzed to identify (block 404) statistical variants, $S_V$. In one example, the statistical variants may be those variants that are interesting to the user. These interesting statistical variants may be defined by the user. An example of a variant may comprise a flow type. Another example of a variant may comprise flow operators such as, for example, cleaning operators, schema modification operators, machine learning operators, and user-defined functions, among others. Still another example of a variant may comprise patterns frequently met in flows such as, for example, a sub-flow for handling slowly changing dimensions, and a sub-flow responsible for connecting two different execution engines, among others. The result of this analysis provides a set of variants a user may want to monitor during statistics collection for F.

The flow, F, is analyzed to identify (block 406) the source data stores involved. In one example, the source data stores may be those data stores that are interesting to the user. These interesting data stores may be defined by the user. A sampling method, S, is identified (block 410) by analyzing (block 408) the data in the identified data stores according to a number of data characteristics such as, for example, data type and distribution, among other characteristics. The method may continue by sampling (block 412) the source data using the sampling method, S, identified at block 410. In one example, the sampling method, S, may be different for each data store identified at block 408.

The method may continue by executing (block 414) flow, F, for the sample source data identified at block 412. During and after flow execution at block 414, the statistical variants, $S_V$, are monitored, and the system collects (block 416) a number of the statistics denoted as $S_f$. In one example, these statistics, $S_f$, can be used for updating cost models of the flow optimizer module (FIG. 1, 162) or for producing cost estimates for a single run. However, in one example, to avoid potential bias and/or statistical errors, the present systems and methods also allow tuning the cost models according to both the runtime statistics and historical statistics monitored in past flow executions or obtained through a number of micro-benchmarks. For greater elasticity, in one example, the present systems and methods also allow choosing an importance ratio of runtime versus historical findings and weighing the statistics accordingly.

Thus, the method of FIG. 4 may continue by obtaining historical statistics from a historical statistics database (420), and combining (block 418) the runtime statistics, $S_f$, obtained at block 416 with the historical statistics obtained from the historical statistics database (420). In one example, the historical statistics database (420) is stored in the database (110) of FIG. 1.

After the method of FIG. 4 is complete, the system (100) may utilized, when executed by the processor (FIG. 1, 120), the cost model/estimate update module (FIG. 1, 168) to tune the cost models according to both the runtime statistics and historical statistics, and to provide updated cost estimates for the execution of the flow. The flow optimization module (FIG. 1, 162) may be utilized, when executed by the processor (FIG. 1, 120), to optimize the analytic flow so that the analytic flow is effective in achieving a number of objectives for a user such as a business entity with as minimum of a cost as possible. The flow execution module (FIG. 1, 166) may be executed by the processor (120) to execute the analytic flow within the system (FIG. 1, 100).

To follow is an example application of how a flow design tool may be extended via the present disclosure in a manner that offers basic flow functionality to provide functionality for micro-benchmarking a flow and collecting statistics. In order to drive the following discussion, some example operators and two example sampling methods will now be described.

When executing a flow, a number of statistics may be collected for each operator. Example statistical variants may comprise a number of read and write rows, input and output rows, elapsed time, and throughput, among other statistical variants. For sampling a data store, a number of actions may be performed. First, to incorporate a sampling method to a flow, a copy of the flow is created and extended with extra operators responsible for the sampling. In one example, the extra operators may be provided after each data store. The tuning of a sampling method may be performed from a user interface as will be described in more detail below, or may also be performed utilizing parameterized scripts. The method is generic in that a user may add as many sampling operators as may be necessary by adding new operators. In the same way, all sampling methods can be easily tuned. In one example, sampling may be performed autonomously by the computing device (105) with little or no user interaction. In this example, the system (100) may choose appropriate values and techniques for tuning the sampling. These values may be predefined or dynamically adjusted based on a dataset to which the sampling is applied and the system's configuration.

Figure 5A:
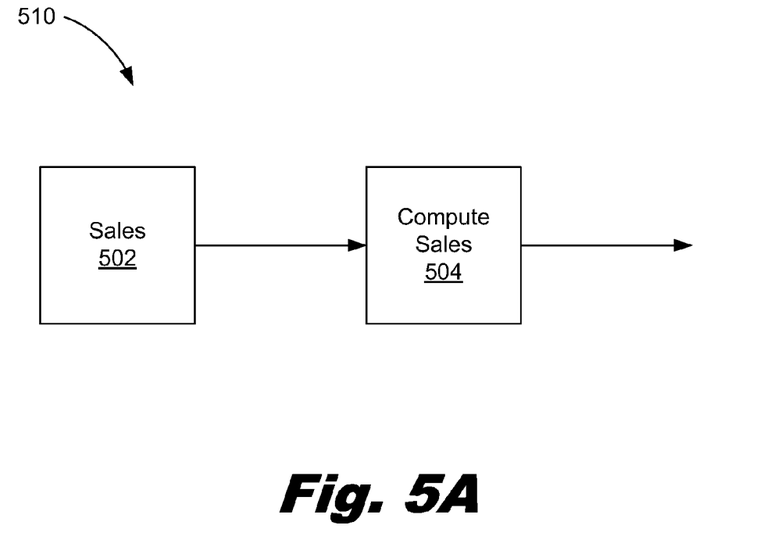
FIG. 5A is a flow diagram of a reservoir sampling method, according to one example.
Figure 5B:
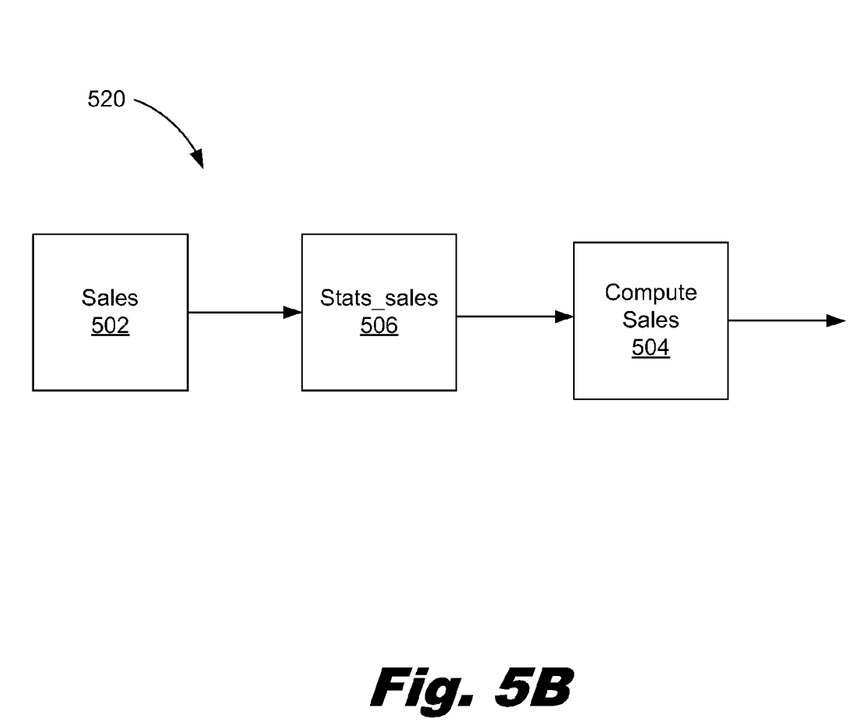
FIG. 5B is a flow diagram of a reservoir sampling method, according to one example of the principles described herein.

Next, two sampling methods will be described. Although only two sampling methods are described herein, any number of different sampling methods may be utilized within the present systems and methods. One sampling method is reservoir sampling. The seed value and the sample size (#rows) may be defined from a user interface provided to the output device (150) of the system (100) of FIG. 1 so that a user of the system (100) may interact with the system and define these and other characteristics. A corresponding operator is attached to each data source output. For reservoir sampling, the seed value is used to randomly choose #rows tuples from the input, and pass the tuples forward to the next operator of the flow. This is described in connection with FIGS. 5A and 5B. FIG. 5A is a flow diagram (510) of a reservoir sampling method, according to one example. FIG. 5B is a flow diagram (520) of a reservoir sampling method, according to one example of the principles described herein. The sub-flow of FIG. 5A that connects an operator "compute sales" (504) to a data store "sales" (502) may be extended with a reservoir sampling operator called "stats_sales" (506), and the sub-flow becomes as shown in FIG. 5A.

Figure 6:
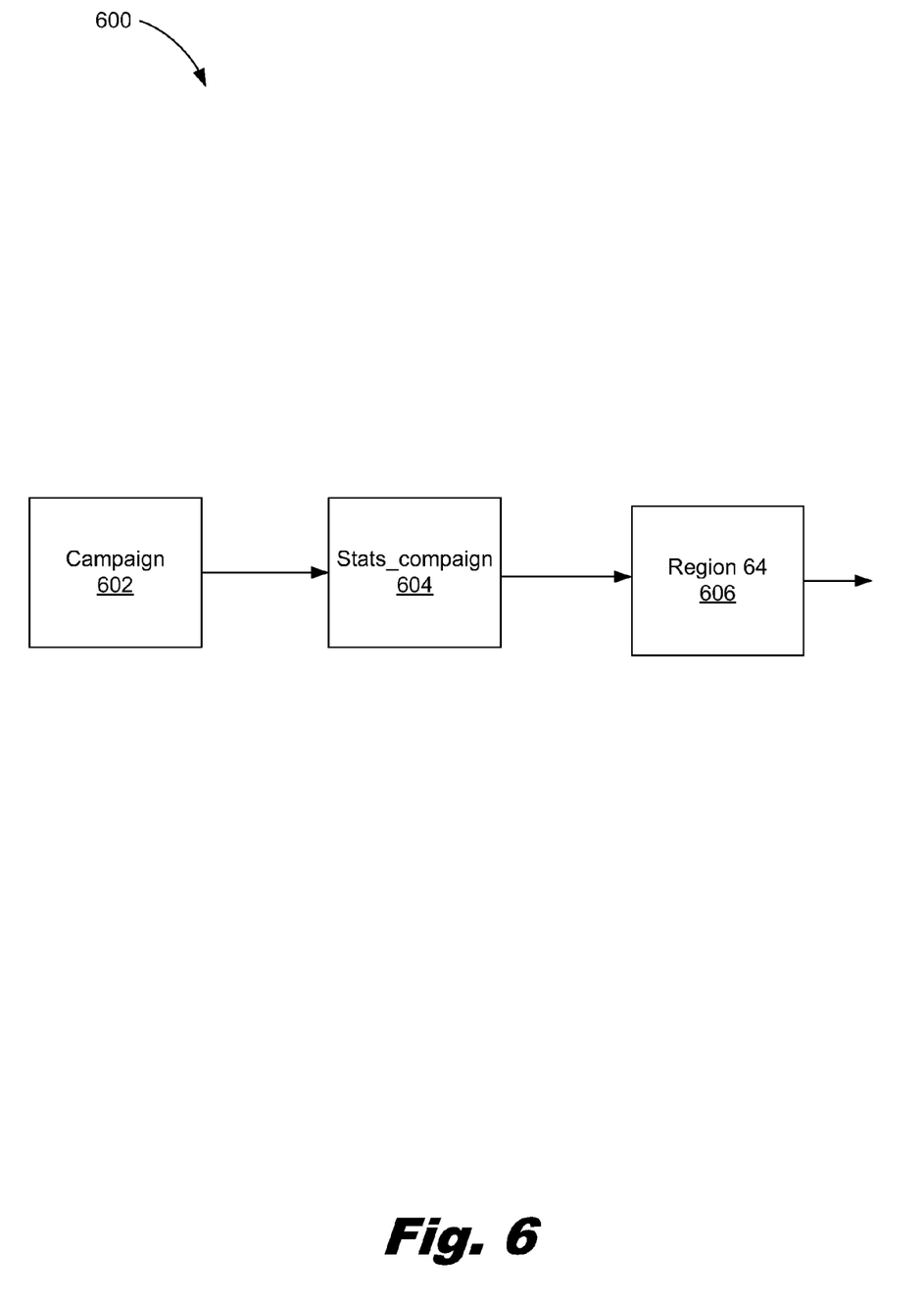
FIG. 6 is a flow diagram of a row sampling method, according to one example of the principles described herein.

Another sampling method is called sample rows. This is a sampling method that takes one argument with the size of the sample (x %), which may be user-defined from the above-mentioned user interface. The original dataset of size n, for example, is divided in x*n/100 groups. From each group, one row is randomly chosen. The list of all selected (i.e., sampled) rows is passed from a "sample rows" operator to a subsequent operator. FIG. 6 is a flow diagram (600) of a row sampling method, according to one example of the principles described herein. FIG. 6 depicts an example sub-flow that samples "campaign" data store, using a "stats_campaign" sampler, before propagating the sample data to the next operator called "Region64."

The above-described sampling methods or other sampling methods utilized in connection with the present systems and methods may comprise default options. For example, for the reservoir sampling described in connection with FIGS. 5A and 5B, the seed value may comprise a default value of 1 and a default sample size of 1000 rows.

Figure 7:
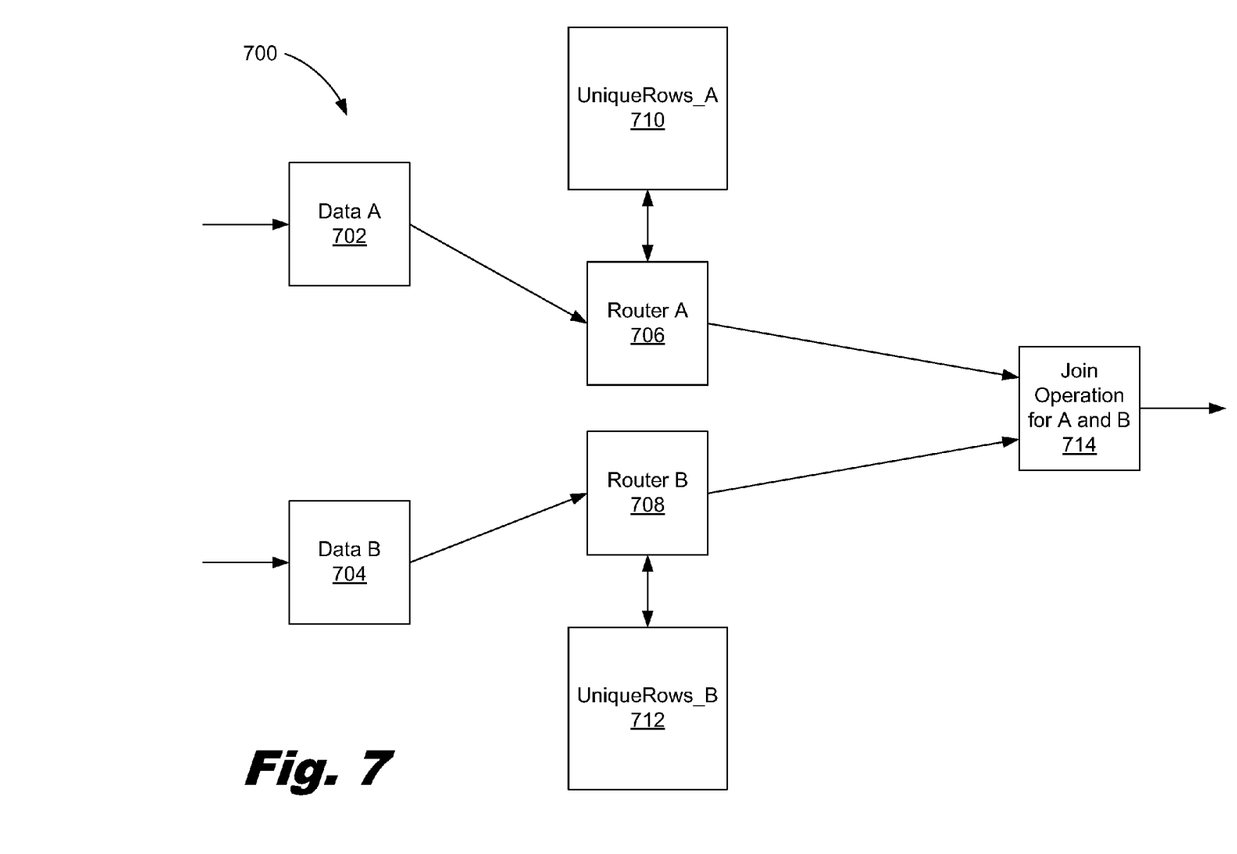
FIG. 7 is a flow diagram of a unique rows determination method, according to one example of the principles described herein.

Next, the disclosure will detail a method for extending a flow design tool to collect flow statistics. FIG. 7 is a flow diagram (700) of a unique rows determination method (700), according to one example of the principles described herein. The method of FIG. 7 is described herein in light of and in reference to FIGS. 2, 3, and 4. The method of FIG. 7 may begin by creating a copy of the flow hereafter referred to it as the "flow." After each source data store in the flow, a sampling operator may be added. In one example, and as a side performance issue, instead of performing the sampling in the flow execution engine utilizing, for example, an ETL tool, it may be more efficient to determine the sampling to the engine where each data store resides.

Based on the objectives a user desires to be satisfied and the application scenario of the given scenario, all source data stores may not need to be sampled. Further, it may be desirable to sample after other operators. For example, given a join with a fact table and a dimension table, a user may wish to sample the fact table, but not sample the dimension table which may be small compared to the fact table, and then sample a resulting join.

The method for extending a flow design tool to collect flow statistics may continue by obtaining the statistics. Statistics can be obtained in a number of different ways. In general, the selectivity of an operator x can be determined as: selectivity(x)=out(x)/card(x), where out(x) is the data size of x's output and card(x) is the input size of x.

For unary operations such as, for example, a filter operation, a sort operation, and java expressions, among other operations, the following holds:

$$\text{out}(x) = \#\text{writtenRows}(x) \qquad \text{Eq. 1}$$

$$\text{card}(x) = \#\text{readRows}(x) \qquad \text{Eq. 2}$$

For getting statistics for binary or n-ary (i.e., operations involving any number of arguments or operands) such as StreamLookup, JoinRows, or MergeJoin, the following may be used. For join operation J with predecessors A (702) and B (704), the selectivity is calculated based on the following formulae:

$$\text{card}(J) = \#\text{writtenRows}(A) * \#\text{writtenRows}(B)/\max(\#\text{unique\_rows}(A), \#\text{unique\_rows}(B)) \qquad \text{Eq. 3}$$

$$\text{out}(J) = \#\text{writtenRows}(J) \qquad \text{Eq. 4}$$

$$\text{selectivity}(J) = \text{out}(J)/\text{card}(J) \qquad \text{Eq. 5}$$

For calculating the above formulae, the number of unique rows coming from A (702) and B (704) is determined. In order to determine the number of unique rows coming from A (702) and B (704), new operators (706, 708, 710, 712) are added in the flow which filters out any duplicate rows. An example of such an operator may be a UniqueRows (HashSet) operator (710, 712). One for each join input A (702) and B (704) may be utilized. This is an example formula and the system (100) does not depend on it. Other formulae may be used as well.

Depending on the design tool, a user may need to be careful not to interfere with the flow semantics and schema. An example solution is to add a number of routers (706, 708) as shown in FIG. 7. The routers (706, 708) create a second task that calculates the number of unique rows. The first task goes to the input of the binary operator (714).

For operations that have more than one output such as, for example, a Splitter operator performing partitioning or a Router operator performing copy partitioning, the following is performed.

For Splitter S with successor operations (A1, . . . , An):

$$\text{card}(S) = \#\text{readRows}(R) \qquad \text{Eq. 6}$$

$$\text{out}(S) = \#\text{writtenRows}(A1) + \ldots + \#\text{writtenRows}(An) \qquad \text{Eq. 7}$$

$$\text{selectivity}(S) = \text{out}(S)/\text{card}(S) \qquad \text{Eq. 8}$$

For Router R with successor operations (A1, . . . , An):

$$\text{card}(R) = \#\text{readRows}(R) \qquad \text{Eq. 9}$$

$$\text{out}(R) = \max(\#\text{writtenRows}(R1), \ldots \#\text{writtenRows}(Rn)) \qquad \text{Eq. 10}$$

$$\text{selectivity}(S) = \text{out}(S)/\text{card}(S) \qquad \text{Eq. 11}$$

Although copy partitioning distributes the exact same dataset across different paths instead of looking into only one of these paths, the present systems and methods may check for the maximum dataset size to account for potential loses of tuples due to system failure. Runtime statistics may be collected for the flow and its operators. In one example, the collected runtime statistics may also be stored as historical statistics for future use.

As described above, a number of methods may be used for cost model updates. In one example, the system (100) may use a runtime statistics over a sampling of the data. In another example, the system (100) may tune the cost models by considering a hybrid means that combines runtime statistics with historical statistics collected by previous flow executions.

To obtain the historical statistics, a number of micro-benchmarks may be run for flows and individual operators. Example statistics of interest comprise operator execution under different tunable parameters such as data sizes and system configurations, different implementations of the same operator executed either on the same or different engine, function shipping micro-benchmarks, and data shipping micro-benchmarks, among other statistics of interest. Example metrics captured comprise execution start date, execution start time, flow identifier, operator identifier, operator type, lines read, lines written, elapsed time, and throughput, among other metrics.

The historical statistics may comprise flow statistics from past executions of the same flow implementation using the same or different data size, executing with the same or different system configuration. The historical statistics may further comprise operator statistics from past executions. For example, assume that the flow at hand contains a sentiment analysis operator. Statistical information for this operator can be obtained from executing the flow with a sample of its data, but this information may be enriched from previous executions of the same operator implementation either in the same or in a different flow. Further, in one example, the historical statistics may comprise combinations of the above. In one example, the historical statistics can be saved in a database schema, or a text file.

Figure 8:
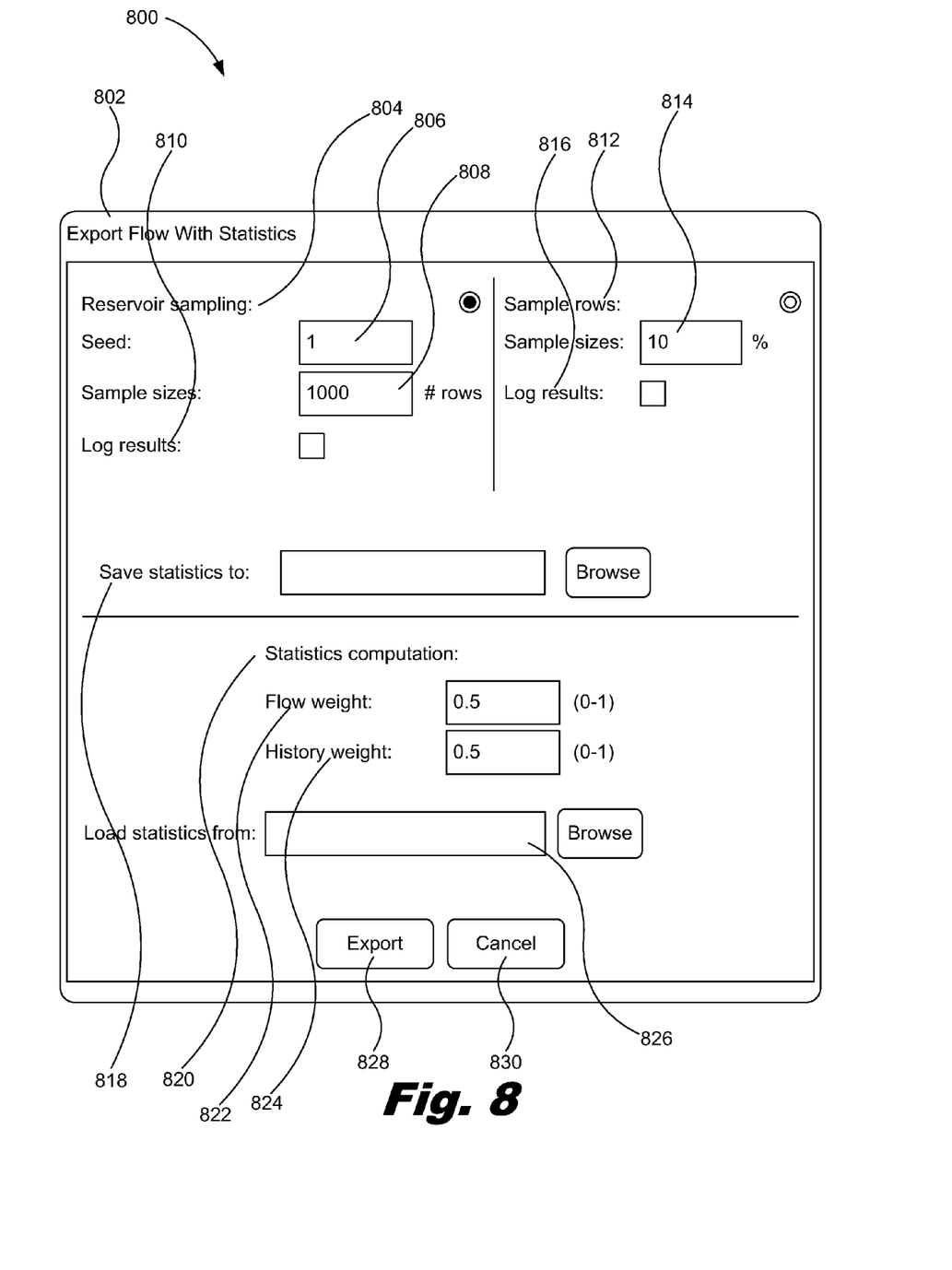
FIG. 8 is a diagram of a user interface for determining sampling parameters, according to one example of the principles described herein.

In one example, for combining the runtime and historical statistics, an importance ratio R=runtime weight/historical weight may be used to specify how each of these two contributes to the cost model. Each weight takes values in the range [0,1], which is a tunable or user-definable parameter. FIG. 8 is a diagram (800) of a user interface (802) for determining sampling parameters, according to one example of the principles described herein. FIG. 8 shows an example input console for tuning sampling parameters, such as the sampling method and its arguments, importance weights, file path or database connection information for connecting to the historical information as described above.

The user interface (802) comprises reservoir sampling toggle (804) and a sample rows toggle (812) to allow a user to select a reservoir sampling method or a sample rows method as the sampling method to be used during the execution of the above processes. As indicated above, any number of sampling methods may be used in connection with the execution of the present systems and methods, and, therefore, any number of sampling methods may be presented in the user interface (802) for selection by the user.

The user, if selecting reservoir sampling, may also define a number of parameters as described above. In the example of FIG. 8, a user may select a seed value number (806) and a sample size in numbers of rows (# rows) (808). Any number of additional parameters may be presented to the user. A log results (810) check box may also be presented to allow a user to select whether or not to have the system (100) log the results of a reservoir sampling in a database.

The user, if selecting the sample rows method of sampling, may also define a number of parameters as described above. In the example of FIG. 8, a sample size (814) in the form of, for example, a percentage (x %) of an original dataset of size n may be input as described above. Further, like the reservoir sampling method, a log results (816) check box associated with the sample rows method of sampling may also be presented to allow a user to select whether or not to have the system (100) log the results of a sample rows method in a database.

The user interface (802) may further comprise a file location definer (818) that allows a user to name a file that contains the obtained statistics and define a location in a file system where the obtained statistics may be stored. The file location definer (818) may comprise a "browse" button that allows a user to browse a number of local or non-local directories to locate a desired directory to which the file is to be stored. Further, the file location definer (818) comprises a file path window in which the user can type a specific directory and file name or view the currently selected file path and name obtained from selecting the browse button. In another example, a location definer may be used to connect to another type of source like a database engine.

The user interface (802) may further comprise a statistics panel (820) that allows a user to indicate what weight various groups of statistics are given. Specifically, the statistics panel (820) comprises a flow weight indicator (822) and a history weight indicator (824) to allow a user to indicate a desired value for the above-mentioned importance ratio R that defines the runtime weight versus historical weight values that specify how each of these two contributes to the cost model. The amounts allowable for input in the flow weight indicator (822) and history weight indicator (824) are 0 to 1, and, in one example, the total amount between the two values adds up to a total of 1. In the example of FIG. 8, the flow weight indicator (822) and history weight indicator (824) each have values of 0.5 indicating that 50% of the weight in determining the contribution to the cost model is attributed from the runtime statistics and 50% of the weight in determining the contribution to the cost model is attributed from the historical statistics.

The user interface (802) may further comprise a load statistics definer (826) that allows a user to name a number of locations from which statistics may be obtained. The load statistics definer (826) may comprise a "browse" button that allows a user to browse a number of local or non-local directories to locate a desired directory at which the statistics to be loaded are stored. Further, the load statistics definer (826) comprises a file path window in which the user can type a specific directory or view the currently selected file path of the statistics to be loaded.

The user interface (802) may further comprise an "export" button (828) and a "cancel" button (830). Once selected by a user, the export button (828) causes the system (100) to execute the methods described herein including the methods described in connection with FIGS. 2, 3, and 4. Selection of the cancel button (830) by the user would cancel any operation performed by the system (100).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor 120 of the computing device (105) or other programmable data processing apparatus, implement the functions or acts specified in the flowchart and/or block diagram block or blocks. In one example, the computer usable program code may be embodied within a computer readable storage medium; the computer readable storage medium being part of the computer program product.

The specification and figures describe systems and methods for optimizing analytic flows. The method may comprise sampling source data using a sampling method, executing a flow over the sampled data, obtaining runtime statistics from the executed flow, and combining runtime statistics with historical statistics. A system for optimizing analytic flows comprises a processor, a memory communicatively coupled to the processor, and a statistical analysis module stored in the memory. The statistical analysis module obtains a flow, F, identifies a number of statistical variants, $S_V$, identifies a number of source data stores, analyzes the source data stores to identify a sampling method, S, for sampling the source data, samples the source data using the sampling method, S to obtain sampled data, executes the flow, F, using the sampled data, obtains runtime statistics, $S_f$, for the statistical variants, $S_V$, and combines the runtime statistics with historical statistics.

A computer program product for optimizing analytic flow comprising a computer readable storage medium comprising computer usable program code embodied therewith. The computer usable program code comprises computer usable program code to, when executed by a processor, design an analytic flow. The computer usable program code further comprises computer usable program code to, when executed by a processor, combine runtime statistics of an executed instance of the flow over the sampled data. The computer usable program code further comprises computer usable program code to, when executed by a processor, combine the runtime statistics with historical statistics, optimize the flow based on the combination of the runtime statistics and historical statistics, and re-execute the flow based on the optimized flow over the source dataset.

Optimizing analytic flows using the present systems and methods may have a number of advantages, including (1) an increase in the accuracy of a cost prediction by collecting runtime statistics and combining them with historical statistics; (2) collection of runtime statistics without manual effort; and (3) easy application to flow design and execution tools without having to change a codebase, among other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of optimizing analytic flows comprising:
sampling, via a processor, source data using a sampling method;
executing, via the processor, a flow over the sampled data;
obtaining, via the processor, runtime statistics from the executed flow;
combining, via the processor, runtime statistics with historical statistics; and
optimizing, via the processor, the flow based on the combination of the runtime statistics and historical statistics.

2. The method of claim 1, in which the sampling method comprises a reservoir sampling method or a sample rows method.

3. The method of claim 1, further comprising:
identifying a number of statistical variants to be monitored during the execution of the flow over the sampled data;
identifying a number of source data stores; and
analyzing the source data stores according to a number of data characteristics.

4. The method of claim 1, further comprising storing in a database the runtime statistics obtained from the executed flow.

5. The method of claim 4, in which storing in a database the runtime statistics obtained from the executed flow comprises storing the runtime statistics as historical statistics.

6. The method of claim 1, in which combining runtime statistics with historical statistics comprises assigning an importance ratio, R, comprising a ratio defining the degree at which the runtime statistics and historical statistics contribute to a cost model.

7. The method of claim 6 in which the importance ratio, R, is user-definable.

8. The method of claim 1, further comprising updating a cost model within a flow optimization module using the combination of the runtime statistics and the historical statistics.

9. The method of claim 1, further comprising updating a cost estimate within a flow optimization module using the combination of the runtime statistics and the historical statistics.

10. The method of claim 1, further comprising re-executing the optimized flow over the source dataset.

11. A system for optimizing analytic flows comprising:
a processor;
a memory communicatively coupled to the processor; and
a statistical analysis module stored in the memory to:
obtain a flow, F;
identify a number of statistical variants, $S_V$;
identify a number of source data stores;
analyze the source data stores to identify a sampling method, S, for sampling the source data;
sample the source data using the sampling method, S to obtain sampled data;
execute the flow, F, using the sampled data;
obtain runtime statistics, $S_f$, for the statistical variants, $S_V$; and
combine the runtime statistics with historical statistics.

12. The system of claim 11, further comprising a historical statistics database.

13. The system of claim 11, further comprising an output device through which a user interface is presented to a user.

14. A computer program product for optimizing analytic flows, the computer program product comprising:
a computer readable storage medium comprising computer usable program code embodied therewith, the computer usable program code comprising:
computer usable program code to, when executed by a processor, design an analytic flow;
computer usable program code to, when executed by a processor, combine runtime statistics of an executed instance of the flow over the sampled data;
computer usable program code to, when executed by a processor, combine the runtime statistics with historical statistics;
computer usable program code to, when executed by a processor, optimize the flow based on the combination of the runtime statistics and historical statistics; and
computer usable program code to, when executed by a processor, re-execute the flow based on the optimized flow over the source dataset.

15. The computer program product of claim 14, further comprising computer usable program code to, when executed by a processor, present a user interface on an output device for tuning a cost model according to both the runtime statistics and historical statistics.

* * * * *